Figure 1:
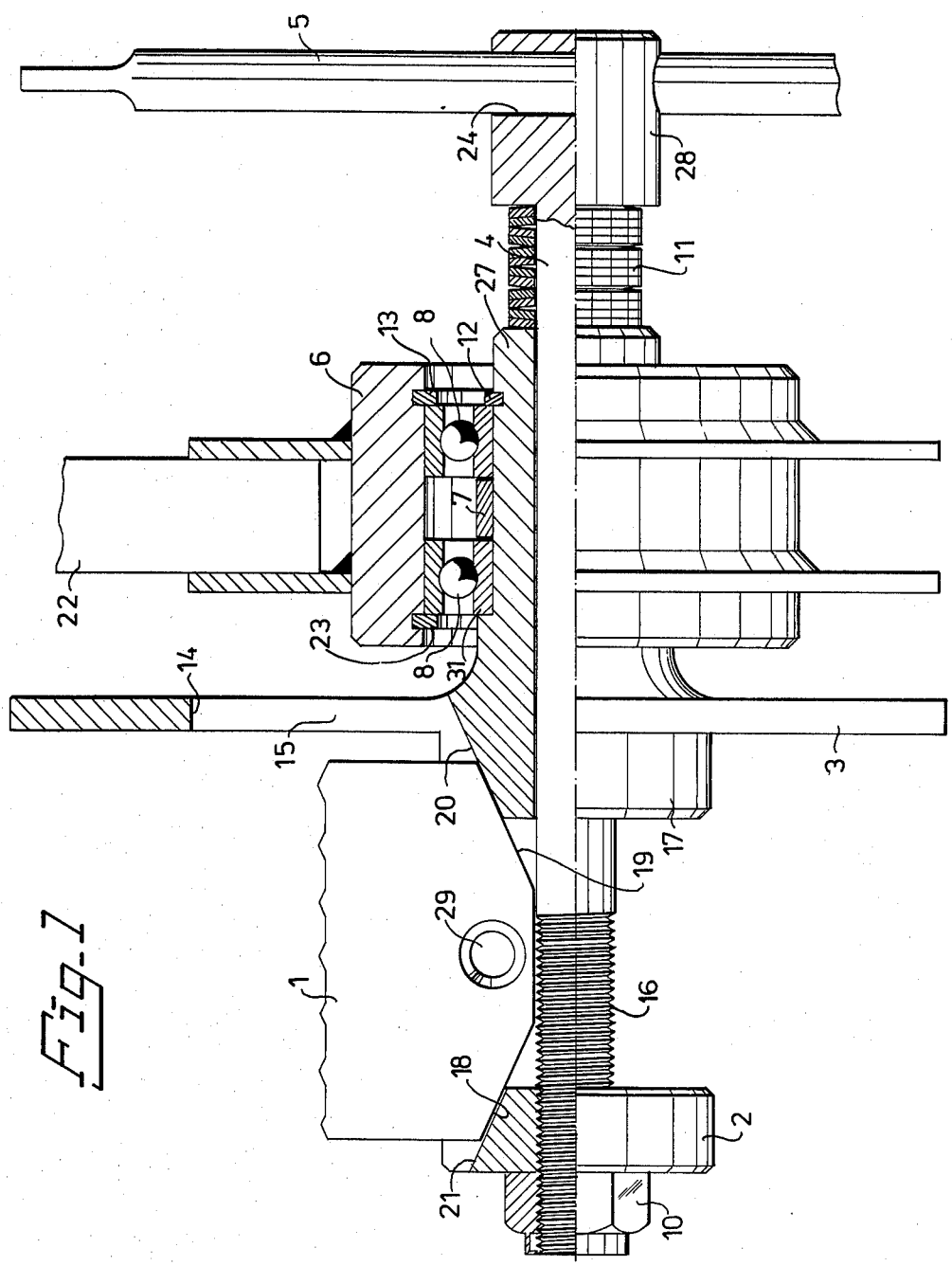

United States Patent [19]

Westin et al.

[11] 4,289,418
[45] Sep. 15, 1981

[54] DEVICE FOR SECURING AN EXPANDABLE HUB IN A HOLE

[76] Inventors: Owe Westin; Oswald Westin; Jan Westin, all of Föreningsgatan 11, 951 43 Luleå, Sweden

[21] Appl. No.: 61,627

[22] Filed: Jul. 30, 1979

[30] Foreign Application Priority Data

Aug. 11, 1978 [SE] Sweden ............................ 7808581

[51] Int. Cl.³ ........................... F16B 2/00; F16B 7/04
[52] U.S. Cl. .................................. 403/369; 403/370; 242/68.4; 279/2 R
[58] Field of Search ............... 403/369, 370, 371, 374; 242/129.5, 129.51, 68.4; 279/2

[56] References Cited

U.S. PATENT DOCUMENTS

| | | | |
|---|---|---|---|
| 1,435,511 | 11/1922 | Sutherland | 279/2 |
| 2,043,353 | 6/1936 | Koonz et al. | 279/2 X |
| 4,121,783 | 10/1978 | Wölfinger et al. | 242/68.4 |

FOREIGN PATENT DOCUMENTS

| | | | |
|---|---|---|---|
| 339368 | 10/1971 | Sweden | 403/369 |
| 302986 | 1/1955 | Switzerland | 279/2 |

Primary Examiner—James Kee Chi
Attorney, Agent, or Firm—Hammond & Littell, Weissenberger and Muserlian

[57] ABSTRACT

The invention relates to a device for securing an expandable hub in a hole, particularly, but not exclusively, the hub of a cable drum wheel in the center hole in the side of a cable drum, the hub having projecting in an axial direction a part which is intended to be inserted into said hole and expanded there to bear against the walls of the hole. The projecting part consists of a number of radially movable tightening jaws, which are capable of being actuated by a bracing block. This bracing block has a number of slots corresponding to the number of jaws, said slots having an inclined guide surface and this guide surface acts upon a corresponding guide surface on one end of the interacting jaw in conjunction with the radial displacement of the jaw when the block is operated, both the jaws and the block remaining unrotatable when operated.

According to the invention a second inclined guide surface at the opposite end of each jaw is arranged to interact with a complementary guide surface at the radially inner end of a radial oblong slot in a guide plate attached to the hub, said jaw in radial and axial movement being unrotatably guided in said oblong slot, and the bracing block is operated by means of a shaft running through the hub, in addition to which said plate permits an improved centering of the device when said device is inserted into the hole.

6 Claims, 4 Drawing Figures

DEVICE FOR SECURING AN EXPANDABLE HUB IN A HOLE

The present invention relates to a device for securing an expandable hub in a hole, particularly, but not exclusively, the hub of a cable drum wheel in the center hold in the side of a cable drum, the hub having projecting in an axial direction a part which is intended to be inserted into said hole and expanded there to bear against the walls of the hole, said part consisting of a number of radially movable tightening jaws, which are capable of being actuated by a bracing block which is capable of being operated by the effect of a force, the block being provided with a number of slots corresponding to the number of jaws, said slots having an inclined guide surface, which surface acts upon a corresponding guide surface on one end of the interacting jaw in conjuction with the radial displacement of the jaw when the block is operated, both the jaws and the block remaining unrotatable when operated.

In the Swedish patent specification No. 339.368 a device for cable drum wheels is described, the purpose of which device is to mount the wheels on a cable drum where the cable drum wheels are of the type which has a hub extended in an axial direction, around the hub being journalled a support ring which fits into the center hole in the side of the cable drum and supports the drum during transportation and when cable is being laid. The support ring is secured in said center hole by means of pivotable bracing wedges, to which a radial pressure against the wall of the center hole is applied by the action of an axially displaceable nut, which is threaded on a tightening screw which can be turned from outside. The nut has a number of oblique grooves, in which the free end of the bracing wedges can slide and be guided with their other end flexibly attached to a retaining ring which is connected to said support ring, both the bracing wedges and the bracing nut being unable to rotate when the tightening screw is turned and respectively driving only a radial and an axial-and-radial motion on the threaded part of the tightening screw.

The present invention relates relates to a device for use, particularly but not exclusively, on cable drum wheels of a similar type, i.e. the cable drum wheels are not mounted on a common axle but are instead mounted one on each side of the cable drum in such a way that the axially extended or projecting part of the hub of the cable drum wheel is inserted in the center hole of the side of the cable drum and secured there with a tensioning device designed for the purpose. A separate cable drum wheel is thus attached on each side of the cable drum.

Among the advantages of such a device it is mentioned in the said patent specification that no common carrying axle is required and that the cable drum wheels can rotate independently of each other, enabling the cable drum easily to be turned and steered in different directions, facilitating both the handling of the drum and the actual cable laying.

The purpose of the present invention is to improve this known device and, among other things, to make it more robust, more reliable, handier and more versatile. One desirable object is therefore for a single person to be able to fit the cable drum wheels to the cable drum, transport the drum by rolling it on the wheels and draw off the cable, wire or rope which is wound on the drum for laying.

In a device according to the invention for securing an expandable hub in a hole, the hub has projecting in an axial direction a part which is intended to be inserted into said hole and expanded there to bear against the wall of the hole, said part consisting of a number of radially movable tightening jaws, which are capable of being actuated by a bracing block which is capable of being operated by the effect of a force, the block being provided with a number of slots corresponding to the number of jaws, said slots having an inclined guide surface, which surface acts upon a corresponding guide surface on one end of the interacting jaw in conjuction with the radial displacement of the jaw when the block is operated, both the jaws and the block remaining unrotatable when operated. The device concerned is characterized essentially in that a second inclined guide surface at the opposite end of each jaw is arranged to interact with a complementary guide surface at the radially inner end of a radial oblong slot in a guide plate attached to the hub, said jaw in radial and axial movement being unrotatably guided in said oblong slot, and that the bracing block is operated by means of a shaft running through the hub, in addition to which said plate permits an improved centering of the device when said device is inserted into the hole.

More particularly the hub is a cable drum wheel hub intended to be secured in the center hole in the side of a cable drum for supporting the drum during transportation and cable laying, in doing which the bracing block can be manoeuvred by means of a threaded shaft which connects with a thread on the bracing block and which runs through the hub, in addition to which said plate can be brought to bear against the side of the cable drum when the projecting part of the hub is inserted into the center hole in the cable drum side.

The radial and axial movement of the jaws is limited in one direction by the radially outermost end of the long slot and in the opposite direction by a stop nut screwed onto the inner end of the shaft. The outer end of the shaft may be provided with a screw handle for turning the shaft manually when the device is being secured or released from the center hole in the side of a cable drum. A hole is drilled transversely through each jaw and through said hole is threaded a helical extension spring which is curved in as circle around the shaft and has both its ends releasably connected in order to keep the jaws radially pressed against said shaft. The outer end of the shaft may suitably have a head, in which case a number of pressure spring washers are inserted between this head and the wheel hub.

A considerable improvement on the known device is represented by the fact that said guide surfaces on the block, jaws and guide plate are so disposed in relation to each other that the jaws effect their radial and axial movement without being inclined relative to the shaft. In other words, the jaws will not in the course of their movement pivot around some real or imaginary point, causing their contact surface as in the known device according to patent No. 339.368 to become relatively small, but practically the whole axial surface of the jaws will engage the inner surface of the center hole in the side of the drum, bringing about an extremely secure fastening of the wheel hub in this hole.

Figure 2:
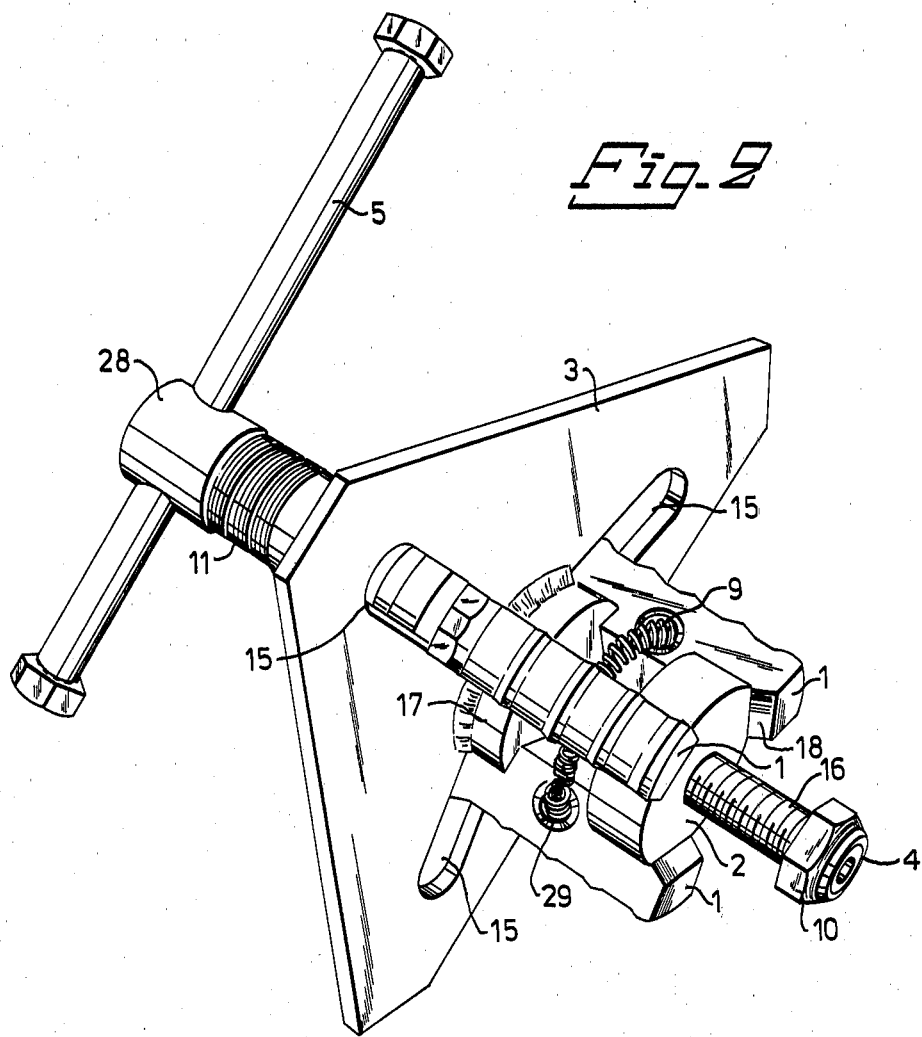
Figure 3:
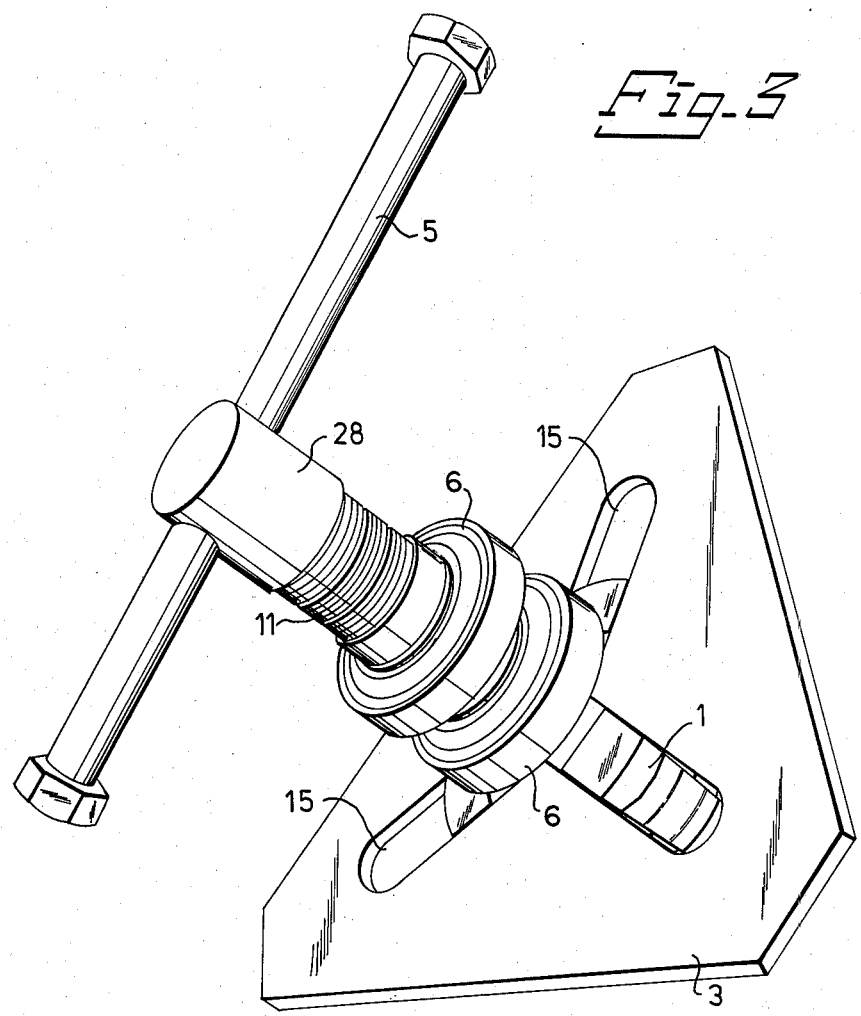
Figure 4:
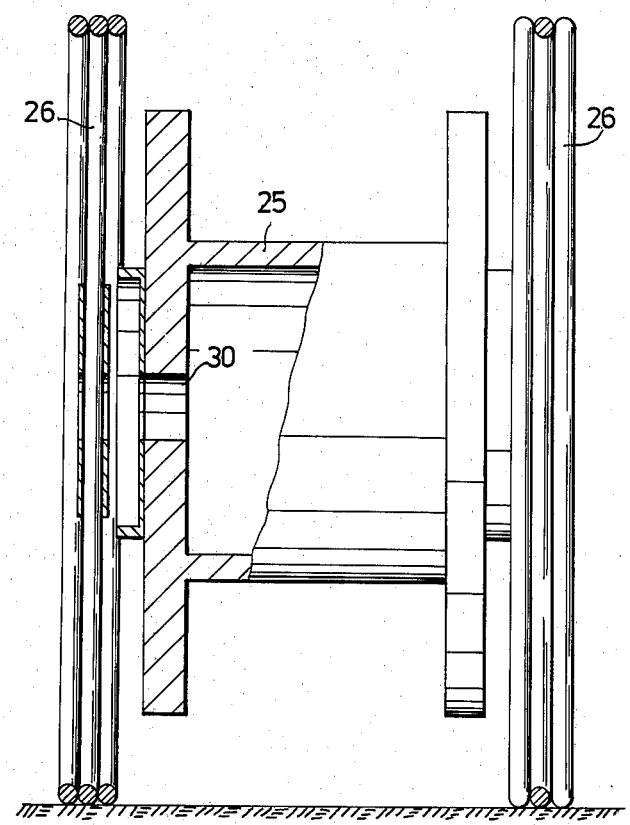

The invention will be described in greater detail making reference to the appended drawings, of which FIG. 1 shows a drum wheel fastening device in part in section, FIGS. 2 and 3 are perspectives of the device seen from within and from without respectively, and FIG. 4 is a total view in very schematic form of the cable drum wheels attached to either side of a cable drum with the aid of a device according to the invention.

The device according to the invention for, for example, securing a cable drum wheel 26 (FIG. 4) to a cable drum 25 consists of as in FIGS. 1–3 a threaded shaft 4, which at the right-hand end in FIG. 1 has a screw handle 5 slidable in a hole 24 drilled in said shaft. The shaft 4 runs through a hub 27 and a number of spring washers 11 are inserted between a head 28 on the end of the shaft and said hub. The left-hand part of the shaft in FIG. 1 is provided with a thread 16, upon which can be screwed a stop nut 10. A bracing block 2 is also disposed on the thread of the shaft and can when the shaft is rotated be moved in one direction or the other depending upon the direction of rotation of the shaft. It is however arranged as described below so that it only travels axially along the shaft and does not rotate at all relative to the shaft. Three jaws 1 encircle the left-hand part of the shaft 4 with uniform spacing around the perimeter of the shaft and are retained by a helical extension spring 9 running around the shaft through holes 29 drilled in the jaws. For each jaw 1 the block 2 has a guideway or guide recess with an inclined surface 21 as a bed interacting with a complementary inclined surface 18 on the left-hand end of the jaw. At the opposite end the jaw 1 has an inclined surface 19 interacting with a complementary inclined surface 20 at the bottom of a circular projection 17 on the hub 27. The hub 27 is designed as one piece with a guide plate 3, which has three long slots 15, each intended to guide a jaw 1. The jaws are intended to be inserted into the center holes 30 (FIG. 4) in the sides of the cable drum 25 and they can be tightened to bear firmly against the inner wall of said hole by the action of the screw handle 5. The threaded shaft 4 can of course also be operated by, for example, hydraulic means, and can be actuated displaceably instead of by turning, in which case the shaft is not equipped with threads. The hub 27 supports on two ball bearings 8 a bearing housing 6 and tube 7 between the bearings. The ball bearings 8 are retained in position by a shoulder 31 on the hub and by three circlips 23, 12 and 13 on the hub and the bearing housing 6 respectively, the latter supporting the spokes 22 of the cable drum wheel.

The mode of operation of the device should be easy to grasp. It should be pointed out that when the handle 5 is turned in one direction from the limit position shown in FIG. 1, said position being determined by the nut 10, the block 2 acts through its guide surfaces 21 with the inclined surfaces 18 of the jaws 1, wherewith the surfaces 20, 19 both guide the jaws axially to the right in FIG. 1 and push them radially outwards at right angles to the shaft 4. The right-hand end of each jaw is guided in its slot 15 in the guide plate 3, preventing the jaws from rotating in relation to the shaft 4. The radial outward movement of the jaws 1 relative to the shaft 4 and against the action of the spring 9 is able to continue until the outer surface of the jaws bears against the inner surface of the hole in the side of the cable drum, wherewith the corresponding cable drum wheel will be firmly attached to the cable drum. Release of the drum wheel is effected by turning the handle part 5 in the opposite direction of rotation.

The securing of a cable drum wheel in the side of a cable drum using the expandable device according to the invention is considerably facilitated by the fact that the tread of the drum wheel is divided into two sections, one of which can be lowered sideways. The drum can then rest directly on the ground on its sides while the extended hub section of the device according to the invention is passed into the center hole in the side of the cable drum without the center drum having to be lifted from the ground. When the device has been expanded to make firm contact in said hole, the same operation is repeated for the securing of the opposite cable drum wheel in the other side of the drum and the drum can then more easily be tipped up onto the wheel treads and thus be lifted from the ground with little effort. Said sections which have been folded sideways can now be returned to their normal position so that the wheels become normal wheels with continuous treads around their circumference. With the aid of the attached cable drum wheels the cable drum can then easily be rolled along the ground and manoeuvred in various directions as required for transportation on the ground and for laying cable. It will be evident that all the said operations, including the lifting of the cable drum from a position on the ground, which is facilitated by the nature of the wheel tread, can be accomplished by a single person. In the construction of the jaws and the arrangement by which they are guided the device according to the invention is much more robust and reliable in service than the device known from the Swedish patent discussed initially.

The invention has been described in a single embodiment and area of application but various modifications and areas of application are possible within the scope of the patent claim.

We claim:

1. In a device for securing an expandable hub in a hole, particularly, but not exclusively, the hub of a cable drum wheel in the center hole in the side of a cable drum, comprising a hub having projecting in an axial direction a part which is intended to be inserted into a hole and expanded there to bear against the walls of the hole, said part consisting of a number of radially movable tightening jaws, which are actuated by a bracing block which is operated by the effect of force, said block being provided with a number of slots corresponding to the number of jaws, said slots having an inclined guide surface, which surface acts upon a corresponding guide surface on one end of the interacting jaw in conjunction with the radial displacement of the jaw when the block is operated, both the jaws and the block remaining unrotatable when operated, said force being applied to said bracing block to force said bracing block against said tightening jaws, the improvement consisting of a second inclined guide surface at the opposite end of each of said interacting jaws, arranged to interact with a complementary guide surface at the radially inner end of a radial oblong slot in a guide plate attached to said hub, said jaw in radial and axial movement being unrotatably guided in said oblong slot, said bracing block being operated by means of a shaft running through said hub, which said plate permits an improved centering of the device when said device is inserted into the hole, said jaws having a traverse hole, and an expandable means connected through said holes whereby said jaws are radially directed against said shaft.

2. Device according to claim 1, wherein said shaft is connected with said bracing block by a threaded connection and the outer end of the shaft has a head, a number of pressure spring washers being inserted between this head the said hub.

3. Device according to claim 1, wherein the radial and axial movement of the jaws is limited in one direction by the radially outermost end of the oblong slot and in the opposite direction by a stop nut screwed on the inner end of the shaft.

4. Device according to claim 1, wherein the outer end of the shaft is provided with a screw handle for turning the shaft manually.

5. Device according to claim 1, wherein said expandable means connected through said holes is a helical extension spring which is curved in a circle round the shaft and has both its ends releasably connected.

6. Device according to claim 1, wherein said guide surfaces on the block, jaws and guide plate are so disposed in relation to each other that the jaws effect their radial and axial movement without being inclined relative to the shaft.

* * * * *